Aug. 15, 1933.                J. C. BAKER                1,923,044
              PROTECTIVE DEVICE FOR CHLORINATING APPARATUS
                         Filed Feb. 23, 1932
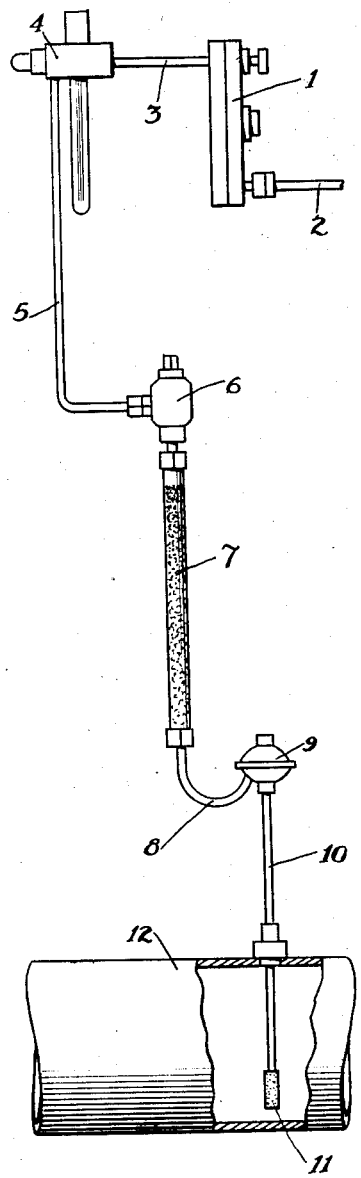
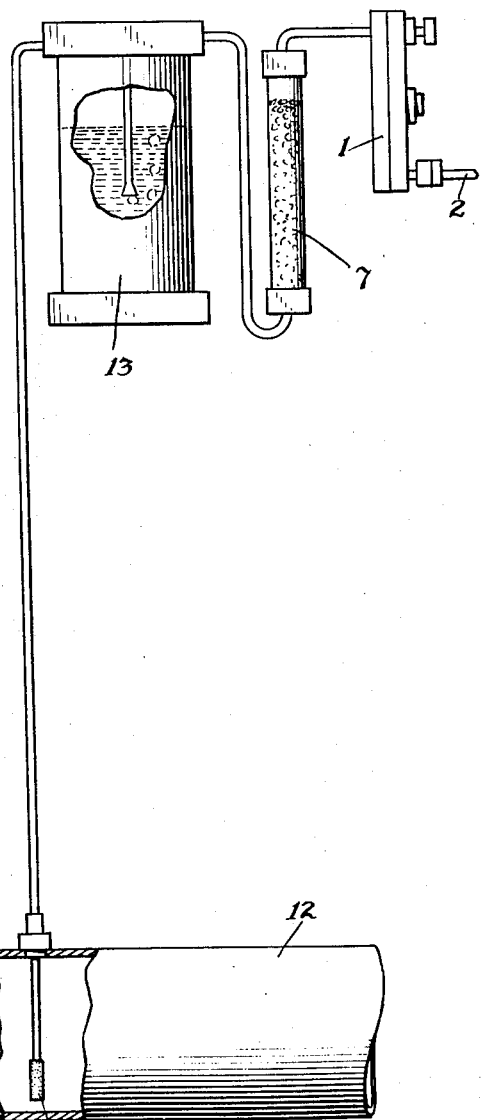
INVENTOR
John C. Baker
BY
Arthur L. Kent
his ATTORNEY Patented Aug. 15, 1933

1,923,044

UNITED STATES PATENT OFFICE 1,923,044

PROTECTIVE DEVICE FOR CHLORINATING APPARATUS

John C. Baker, Montclair, N. J., assignor to Wallace & Tiernan Products, Inc., Belleville, N. J., a Corporation of New Jersey Application February 23, 1932. Serial No. 594,587

4 Claims. (Cl. 210—28)

This invention relates to protective devices for chlorinating apparatus designed more particularly to prevent solutions of chlorine or moist chlorine gas from coming in contact with valves or other parts of the gas supply apparatus which are liable to be corroded by such solutions. Many materials are practically unaffected by substantially dry chlorine gas but are acted upon by chlorine solutions or moist chlorine gas.

While chlorine is flowing through a pressure reducing device and a meter, if such be employed, to a place of discharge into water or watery liquid, the flow of gas prevents water backing up from the place of discharge to the meter and/or pressure reducing device. When, however, the flow of chlorine is cut off, either purposely or accidentally, the water absorbs chlorine remaining in the chlorine supply pipe and backs up in the pipe. As water at 10 to 20° C. absorbs from 2 to 3 times its own volume of chlorine, the backing up of water may continue until some flow-controlling or other part of the apparatus which may be harmed is reached. Also, most metallic surfaces may react with chlorine and cause a further backing up.

Check valves are apt to stick or leak and cannot be relied on for preventing such backing up of water in a chlorine supply tube.

According to the present invention, such backing up of water is held in check by inserting in the chlorine line a chamber containing a material capable of adsorbing chlorine, such as silica gel or activated charcoal. Silica gel under normal room temperatures and pressure will adsorb about 17 times its own volume of chlorine gas. It does not have the power, however, to adsorb such quantity of chlorine from moist chlorine gas or from solutions of chlorine. When water or water vapor comes in contact with silica gel containing adsorbed dry chlorine gas, the silica gel no longer has the power to hold the greater part of the chlorine, so the latter is liberated, thereby preventing the pressure of the chlorine above the water dropping and thereby avoiding the sucking of the water higher in the apparatus. Equilibrium is reached between the remaining chlorine gas in the tube and the solution of chlorine produced by the backing up of the water and water vapor before such solution or moist chlorine gas can reach any part which it is desired to protect from the action of chlorine solutions or moist chlorine gas.

When chlorine flow is again initiated, any water which has entered the adsorbent chamber, except such as adheres to the material therein, is promptly expelled. The adhering water, and later the larger part of the adsorbed water, is slowly evaporated by passage of the dry chlorine therethrough.

As the action of the adsorptive material involves the alternate wetting and drying of a part of such material, it is desirable to use material which is substantially unacted upon by moist chlorine gas or aqueous chlorine solutions. Silica gel is superior to activated charcoal in this respect.

Adsorptive materials also differ in adsorptive capacity, but, so far as this property is concerned, it is sufficient if the chlorine released by the adsorptive material when moisture reaches such material, plus the chlorine between the grains of the adsorptive material, is more than sufficient to saturate completely the water entering the chamber containing the adsorptive material.

A full understanding of the invention can best be given by a description in connection with a diagrammatic showing of two illustrative embodiments of the invention. In the accompanying drawing:

Fig. 1 is a diagrammatic view of the chief parts of an apparatus for treating flowing water with chlorine and in which is incorporated the protective device of the present invention; and Fig. 2 is a diagrammatic view of parts of another form of chlorinating apparatus showing another location of the present protective device.

The apparatus for supplying chlorine gas shown diagrammatically in Fig. 1 is of the general type illustrated and described in U. S. Patent No. 1,283,993 of Wallace & Tiernan. As shown, 1 represents a diaphragm type of pressure reducing valve adapted to receive chlorine gas under high pressure from a cylinder of liquid chlorine (not shown) through a pipe 2 and deliver the gas at a low regulated pressure through a pipe 3 to a device 4 providing a flow-controlling orifice and meter. This flow meter as shown is of the manometer type, adapted to indicate the drop in pressure between the two sides of a constriction in the gas line and thereby enable the rate of gas flow through such line to be determined.

The chlorine gas leaves the flow-controlling orifice by a pipe 5 connected to a cut-off valve 6 of any suitable construction. To this cut-off valve is connected one end of a tube 7, preferably of transparent material, such as glass or clear quartz, so that its contents are visible at all times. The other end of this glass or quartz tube is connected by a pipe 8 to a check, or non-return, valve 9. The latter may conveniently have the construction shown in Fig. 13 of U. S. Patent No. 1,283,993. From the non-return valve 9 a pipe 10 leads to a chlorine diffuser 11 arranged in a conduit 12 for the water to be chlorinated.

The glass tube 7 is filled with silica gel or other adsorptive material so that, should the supply of chlorine be shut off either purposely or accidentally, due to stoppage of the chlorine line at some point, and should the non-return valve 9 fail to prevent the backflow of water, water will not be able to reach the shut-off valve 6 and other parts of the chlorine supply apparatus.

The chlorine supply apparatus shown in Fig. 2 differs from that of Fig. 1 in that a flow meter 13 of the bubble type is used instead of one of the manometer type. The flow meter 13 consists of a glass walled container partially filled with liquid through which the chlorine gas bubbles, the rate of flow of the chlorine being determined by the number of bubbles per unit of time. If the liquid in the meter chamber is water, it will become saturated with chlorine and consequently be highly corrosive. Hence it is highly desirable to prevent such water or water vapor therefrom backing up and reaching other parts of the apparatus. For this reason the adsorption tube 7 is placed between the flow meter 13 and pressure reducing valve 1. Obviously, the adsorption tube 7, especially if not of very small bore, may more desirably be elevated relatively to the flow meter from the position shown in Fig. 2 so that the connecting tube will extend downward from the adsorption tube to the flow meter instead of upward, as shown, in order that any water which may flow back in the connecting tube shall not become trapped therein.

The term of "water" as used in the claims will be understood to include watery, or water-containing, liquids.

What is claimed is:

1. In a chlorine supply apparatus, apparatus for supplying chlorine gas, a water container into which chlorine from said device is normally admitted, and a chamber connected to the gas flow line between said supply apparatus and said container normally closed except for the passages by which chlorine gas is admitted to and discharged from said chamber, said chamber containing a substance capable of adsorbing chlorine to a greater extent than chlorine can be dissolved in water, so that, if when the flow of chlorine ceases moisture enters said chamber from said container, chlorine will be liberated from such substance to oppose the flow of water into said chamber.

2. A chlorine supply apparatus, as in claim 1, in which the adsorbent material is silica gel.

3. A chlorine supply apparatus, as in claim 1, in which the adsorbent material is activated charcoal.

4. A chlorine supply apparatus, as in claim 1, in which the chamber containing the adsorbent material is formed of transparent material and arranged in a general vertical direction to allow rise and fall of water therein to be observed.

JOHN C. BAKER.